United States Patent [19]

Powers et al.

[11] Patent Number: 4,780,513

[45] Date of Patent: Oct. 25, 1988

[54] MODIFIED LEWIS ACID CATALYZED POLYMERIZATION

[75] Inventors: Kenneth W. Powers, Berkeley Heights; Ralph H. Schatz, Westfield, both of N.J.

[73] Assignee: Exxon Research & Engineering Co., Florham Park, N.J.

[21] Appl. No.: 889,682

[22] Filed: Jul. 24, 1986

Related U.S. Application Data

[63] Continuation of Ser. No. 649,386, Sep. 11, 1984, abandoned, which is a continuation of Ser. No. 429,139, Sep. 30, 1982, abandoned.

[51] Int. Cl.$^4$ .......................... C08F 2/14; C08F 10/08; C08F 10/10; C08F 4/14
[52] U.S. Cl. ..................................... 526/88; 526/185; 526/186; 526/339; 526/348.6; 526/348.7
[58] Field of Search ............ 526/185, 186, 339, 348.6, 526/348.7, 88

[56] References Cited

U.S. PATENT DOCUMENTS

| | | | |
|---|---|---|---|
| 3,159,607 | 12/1964 | D'Alelio | 260/82.1 |
| 4,252,710 | 2/1981 | Powers | 260/33.8 |
| 4,269,955 | 5/1981 | Wagensommer | 526/185 |

*Primary Examiner*—Joseph L. Schofer
*Assistant Examiner*—F. M. Teskin
*Attorney, Agent, or Firm*—J. J. Mahon; H. L. Cohen

[57] ABSTRACT

Protection against molecular weight depression in the polymerization reaction producing polyisobutylene rubber or butyl rubber is achieved through addition of minor amounts of certain metal alkyls, particularly the lower alkyl aluminum compounds or lower alkyl aluminum hydrides which function as buffering, neutralizing or complexing agents against polymerization poisons and extraneous catalyst activators.

17 Claims, No Drawings

MODIFIED LEWIS ACID CATALYZED POLYMERIZATION

This case is a Rule 60 continuation of U.S. Ser. No. 649,386 filed on Sept. 11, 1984, now abandoned, which is a Rule 60 continuation of U.S. Ser. No. 429,139 filed on Sept. 30, 1982, now abandoned.

BACKGROUND OF THE INVENTION

1. Field of the Invention

This invention relates to the polymerization of the elastomeric homopolymer polyisobutylene rubber and the elastomeric copolymer butyl rubber, especially the polymerization reaction required to produce the isobutylene-isoprene form of butyl rubber. More particularly, the invention relates to a method of protecting the polymerization process used to produce polyisobutylene and butyl rubbers against molecular weight depression and other undesirable effects caused by the presence of polymerization poisons and/or activators, through addition of a buffering neutralizing or complexing agent to the polymerization zone.

2. Description of the Prior Art

A significant problem encountered in the butyl rubber producing process is the sensitivity of the reaction system to the presence of polymerization poisons and catalyst activators, which, even in trace quantities can substantially adversely affect the polymerization process by reacting or complexing with the catalyst species or propagating carbonium ions to profoundly affect the initiation, propagation, transfer, and termination steps of the polymerization. The consequences are observed as severe molecular weight depression in the butyl rubber product, activation or deactivation of the catalyst system, and often times rapid warmup and plugging of the polymerization reactors. The polymerization poisons and activators include oxygenated compounds such as alcohols, ketones and ethers; acidic compounds such as hydrogen chloride, chlorine, chlorine containing organic compounds, and organic acids. Many of these polymerization poisons or activators are produced in the various zones of the butyl rubber production system where water is present and result from hydrolytic reactions involving methyl chloride and/or methylene chloride. Some are produced by chemical reactions which take place in the alumina drying step of the process which is used to remove water in the diluent recycle section of a butyl plant. Still others are introduced as impurities present in the monomer feed streams. Specific examples of polymerization poisons and/or activators include methanol, isopropanol, acetone, dimethylether, diethylether, dimethoxymethane, t-butyl alcohol, t-butyl chloride, bis-chloromethylether, gaseous chlorine, hydrogen chloride, propionic acid, and the like.

Recognition of this problem in the prior art is found in U.S. Pat. No. 3,005,008, issued Oct. 24, 1961, to kelley et al wherein polymerization poisons are removed as one aspect of a process for treating the recycled diluent of the butyl rubber polymerization process. So far as the inventors hereof are aware, no effective technique has been disclosed in the art for adding a complexing or buffering agent to the polymerization reaction mixture in order to eliminate the molecular weight depression and other problems associated with the presence of the polymerization poisons or activators noted above.

The use of aluminum alkyls to purify hydrocarbon diluents used in the polymerization of alpha-olefins is disclosed in British Pat. No. 920,513 (1963) issued to Eastman Kodak Company. Similarly, in British Pat. No. 1,298,909 (1972) issued to Monsanto Company, is disclosed the use of trialkyl aluminum compounds as a scavenger for water, oxygen and trace amounts of alcohol and other impurities in connection with a process for the Ziegler polymerization of olefins such as ethylene. While some of the trialkylaluminum compounds used in this Monsanto British Patent are employed in the present invention, the manner of their use in the reference and the polymerization process of the reference are distinct from the present invention. Similarly, in U.S. Pat. No. 3,257,332 issued June 2, 1966 to Ziegler et al, excess quantities of aluminum trialkyl are used to eliminate impurities in feedstock ethylene employed in an ethylene polymerization process. Also in U.S. Pat. No. 3,442,878 issued May 6, 1969 to Gippin, dihydrocarbon aluminum chlorides ae used to destroy impurities present in isoprene feedstock and in the hydrocarbon solvent used for isoprene polymerization.

SUMMARY OF THE INVENTION

In accordance with the present invention, there has been discovered an improved method of preparing $C_4$-$C_7$ isoolefin homopolymers such as polyisobutylene rubber by Lewis Acid catalyzed polymerization or butyl rubber by the Lewis Acid catalyzed polymerization of a $C_4$-$C_7$ isoolefin with a $C_4$-$C_{14}$ conjugated diene in an inert diluent, comprising adding to the polymerization reaction zone up to about 1.0 to about 1.25 mole of a complexing or buffering agent per mole of catalyst in an amount effective to protect the rubber product against molecular weight depression due to the presence of polymerization poisons and catalyst activators, the complexing or buffering agent comprising certain metal alkyls, particularly a lower trialkyl aluminum, the alkyl being methyl or ethyl, or a lower dialkyl aluminum hydride, the alkyl in said hydride being a $C_1$-$C_4$ alkyl group. Other metal alkyls such as magnesium di-n-hexyl have also been found to be useful in the practice of this invention but are generally less effective and more expensive than the preferred aluminum alkyls.

The particularly preferred complexing or buffering agent for use in the present invention has been found to be triethylaluminum. Other preferred complexing or buffering agents found suitable are trimethylaluminum and diisobutylaluminum hydride. In a preferred embodiment, the alkyl buffering or complexing agent is added to the cold monomer feed stream just prior to its introduction into the polymerization reaction zone.

A variety of substantial improvements accrue from employment of the process of the present invention. The polymerization reaction is protected effectively against the harmful effects caused by sudden or unexpected variation in the level of the trace quantities of the polymerization poisons noted above. The alkyl acts as a buffering agent or complexing agent which maintains the free concentration of these poisons at contant, low levels. The problem of molecular weight depression is essentially eliminated, enabling the desired molecular weight polymer to be produced at a relatively lower steady-state unreacted monomer concentration, which is a substantial economic benefit to the process. The buffering agent of the present invention permits higher tolerable levels of these polymerization poisons to be present. The need for extensive purification of feed and recycle monomer and diluent streams is substantially reduced. Also, startup of the polymerization system is greatly facilitated since the need for excessive initial catalyst flow to overcome poisons present is alleviated. Operation with the alkyl buffering agent present also results in a reduced rate of reactor warm-up as polymerization proceeds.

DETAILED DESCRIPTION OF THE INVENTION

The term "butyl rubber" as used in the specification and claims means copolymers of $C_4$–$C_7$ isoolefins and $C_4$–$C_{14}$ conjugated dienes which comprise about 0.5 to about 15 mole percent conjugated diene and about 85 to 99.5 mole percent isoolefin. Illustrative examples of the isoolefins used in the preparation of butyl rubber are isobutylene, 2-methyl-1-propene, 3-methyl-1-butene, 4-methyl-1-pentene and beta-pinene. Illustrative examples of conjugated dienes which may be used in the preparation of butyl rubber are isoprene, butadiene, 2,3-dimethyl butadiene, piperylene, 2,5-dimethylhexa-2,4-diene, cyclopentadiene, cyclohexadiene and methylcyclopentadiene. Preparation of butyl rubber is described in U.S. Pat. No. 2,356,128, and is further described in an article by R. M. Thomas et al in *Industrial and Engineering Chemistry*, Volume 32, pages 1283 et seq., October, 1940. Butyl rubber generally has a viscosity average molecular weight from about 100,000 to about 800,000, preferably about 250,000 to about 600,000, and a Wijs Iodine No. of about 0.5 to 50, preferably 1 to 20. The term isoolefin homopolymers are used herein is meant to encompass those homopolymers of $C_4$–$C_7$ isoolefins, particularly polyisobutylene, which have a small degree of terminal unsaturation and certain elastomeric properties.

The principal commercial form of butyl rubber is isobutylene-isoprene butyl rubber and both butyl rubber and polyisobutylene are produced in a low temperature cationic polymerization process using Lewis Acid type catalysts, typically aluminum chloride ($AlCl_3$); it is recognized that $BF_3$ is also useful. The process extensively used in industry employs methyl chloride as the diluent for the reaction mixture at very low temperatures, that is less than about $-90°$ C. Methyl chloride is used for a variety of reasons, including the fact that it is a solvent for the monomers and aluminum chloride catalyst and a non-solvent for the polymer product. Also, methyl chloride has suitable freezing and boiling points to permit respectively low temperature polymerization and effective separation from the polymer and unreacted monomers. Other suitable diluents for use in the butyl rubber polymerization process are methylene chloride, vinyl chloride, ethyl chloride, propane, butane, pentane and hexane, but methyl chloride is the particularly preferred polymerization diluent.

In preparing butyl-rubber, about 70 to 99.5 parts by weight, preferably 85 to 99.5, of an isoolefin such as isobutylene is reacted with about 30 to 0.5 parts of a conjugated diene, such as isoprene. Particularly preferred is the reaction product of 95 to 99.5 percent by weight of isobutylene, with 0.5 to 5 percent by weight of isoprene. These monomers with about 1 to 5 volumes of inert diluent, such as methyl chloride, are cooled to a temperature between about $-600°$ C. to $-130°$ C. The cold mixture is polymerized in a reaction zone by the addition of a Friedel-Crafts catalyst, preferably aluminum chloride. Generally about 0.02 to about 0.5 percent by weight of catalyst, based on the weight of mixed olefins, used.

Throughout the specification, examples and claims the term complexing agent as used herewith is used interchangeably with the term buffering agent. The inventors hereof do not mean to draw any distinction between these two terms.

In practicing the present invention, a number of conditions and limitations must be observed in order to realize the benefits hereof. These relate to the quantity of complexing or buffering agent used and the manner of its addition to the reactor, that is, the control of injection temperature and residence time prior to the entry of the buffering agent into the polymerization reaction zone.

The quantity of buffering agent used is a function principally of the amount of catalyst employed. It has been found that the amount of buffering agent should not exceed about 1.0 to about 1.25 mole, preferably should not exceed about 1.0 mole per mole of polymerization catalyst. If a significant molar excess of buffering agent over catalyst is present, reaction of it with the aluminum chloride catalyst, or the Lewis Acid catalyst, is likely to occur with very sharp reductions in catalyst efficiency. Catalyst efficiency is defined as the weight of polymer produced per weight of catalyst. Through controlled experiments, it has been found that the minimum effective amount of buffering agent is that which is in molar excess over the polymerization poisons present in the reaction mixture. Therefore, in connection with the practice of the present invention, the proper guideline is that the quantity of complexing or buffering agent be not more than about 1.0 to about 1.25, preferably not more than about 1.0 mole per mole of polymerization catalyst since the polymerization poisons when present are always present in amounts which are significantly less than the amount of catalyst used. A substantial molar excess of buffering agent over polymerization poisons is not harmful to the practice of the present invention. Generally speaking, the amount of complexing or buffering agent to be used is in the range of about 0.1 to 1 mole ratio to 1 to 1 mole ratio; the preferred quantity is between 0.5 to 1 and 1 to 1 moles of buffering agent per mole of polymerization catalyst such as aluminum chloride.

Location of the injection point of the buffering agent and the injection temperature are also important factors to the successful practice of the present invention. If the buffering agent is added to the cold incoming monomer feed stream containing monomers and inert diluent it must be done so immediately prior to introduction of the feed stream into the polymerization reaction mixture. When butyl rubber is being produced, the monomer feed stream typically contains a blend of the isoolefin and conjugated diolefin monomers. Residence for any appreciable time in the feed stream will result in undesirable side reactions with monomer taking place, which will limit the effectiveness of the buffering agent. A residence time in excess of several minutes in the cold feed has been found to be undesirable in many cases.

In one method of practicing the present invention therefore, the buffering agent is injected into the polymerization zone such that the residence or contact time of the buffering agent with the monomers prior to polymerization is generally less than about 60 seconds, preferably less than about 30 seconds, most preferably less than about 10 seconds. Using this technique, one method of adding the buffering agent to the polymerization zone would be to introduce it into the reactor at the startup of the process, prior to the addition of monomer(s) and catalyst to the polymerization zone. The agent would then be continuously introduced as polymerization proceeds. Alternatively, and preferably, the agent is added directly to the cold monomer feed stream immediately before the reactor, with due consideration of residence time. In another approach, the buffering or complexing agent is present in the polymerization zone prior to the introduction of monomer(s) and then as monomers are introduced, the agent is added to the monomer feed stream in an appropriate amount to achieve buffering or complexing. Alternative equivalent methods will be apparent to those skilled in the art based on a description of the important variables as described herein, particularly in the examples.

Preferred embodiments of butyl rubber to which the invention is applicable are isobutylene-isoprene butyl rubbers made using aluminum chloride catalyst and methyl chloride diluent, the product having a viscosity average molecular wt. of about 250,000 to 600,000 and a Wijs Iodine No. of about 1 to 20. The invention is further illustrated by the following examples, which are not to be considered as limitative of its scope.

Procedure and Materials for Examples 1–11

A series of batch polymerizations were performed in a nitrogen purged dry box to show the deleterious effect of traces of an oxygenated base on butyl rubber molecular weight and to show the effectiveness of the buffering agents in accordance with the present invention. The entire series of runs are made using aliquots removed from a common feed blend so that the feed was the same for each run in the series; and the entire series was also made using aliquots removed from a common batch of catalyst solution so that the catalyst was identical for each run in the series. The various runs in the series differed then only in the variables under investigation.

Polymerizations were run using standard Pyrex glass 500 ml 4-neck round bottom flasks with ball-jointed necks. A standard bearing and ground glass stirrer shaft were connected through the center neck and glass thermowells were connected through two of the side necks. One of the thermowells was for a thermometer to visually monitor reaction temperature; the other for a thermocouple connected to a recoder. A jacketed and cooled dropping funnel was mounted over the third side neck. Measured amounts of catalyst solution were allowed to drip slowly from the dropping funnel into the reactor as desired. In making a run, the following general procedure was used:

1. An aliquot of the feed blend was weighed into the reaction flask, which was then clamped into position, immersed up to the neck in a cooling bath.

2. The stirrer shaft was connected to the stirrer motor mounted above the bath and stirring was started. The thermometer and thermocouple were placed into their respective wells.

3. After reactor contents had reached desired temperature, the desired poisons, activators or buffering agents were introduced through a volumetric pipette before the catalyst dropping funnel was mounted over the third neck and clamped into position. The dropping funnel jacket was filled with cold bath liquid and the the desired catalyst solution was poured into the funnel.

4. After the desired residence time, catalyst solution was allowed to drip slowly into the reactor until the desired volume had been added. The catalyst addition rate was controlled to maintain only a small temperature difference between the bath and reactor so that polymerization temperature was carefully controlled.

5. When the desired amount of catalyst had been added and the desired reaction time had elapsed, a measured volume of cold methanol was added to the reactor as a quench. The quenched reactor was then unclamped and removed from the bath and placed into the dry box vestibule from which it was removed and placed into a hood, where it was allowed to warm and boil off unreacted monomers and methyl chloride. Isopropyl alcohol containing 1 percent PX-441 as an inhibitor was added to the reactor flask as the volatiles boiled off to keep the polymer from discoloring and degrading due to catalyst residues. After it had warmed to room temperature, the polymer was quantitatively recovered. It was kneaded in isopropyl alcohol to remove catalyst residues and then 0.2 percent PX-441 was mixed into it before drying in a vacuum oven at 70° C. The dried polymer was weighed and subjected to analyses.

Isobutylene employed was purified by scrubbing through anhydrous calcium chloride and anhydrous barium oxide to remove any moisture and distilled just prior to use through a small fractionating column located in the dry box. The methyl chloride used was Ansul high purity grade obtained from Air Products Speciality Gas Division. Isoprene used was dried over white Drierite and freshly distilled through a fractionating column before use. The catalyst solution used in the batch polymerization runs was aluminum chloride dissolved in methyl chloride. A saturated solution containing 0.9 grams $AlCl_3$ per 100 grams of solution was prepared by refluxing methyl chloride over $AlCl_3$ and this was diluted to the desired concentration with freshly scrubbed and filtered methyl chloride.

A batch of feed for a series of runs was prepared by weighing the desired amount of cold isoprene-isobutylene and methyl chloride into a cold feed flask and then mixing and storing in a stoppered flask in a cold bath. Aliquots of this feed blend were weighed into the individual reactors for the series of runs. In each run of Example 1 set forth below, and Examples thereafter, 230 grams of a feed blend consisting of 0.75 grams isoprene, 24.25 grams isobutylene and 205 grams methyl chloride were charged to the reactor. The reactor was then stirred and cooled as described above to −140° F., the indicated amount of polymerization poison and/or stabilizer or buffering agent was added and the catalyst solution consisting of 0.18 grams $AlCl_3$ per 100 grams methyl chloride was allowed to drip in slowly to initiate polymerization. Over the course of about 10 minutes enough catalyst was added to convert about 25 percent of the monomer to polymer while maintaining reaction temperature at −140° F. The reaction was quenched with methanol and the polymer recovered and dried as outlined above.

In the following Examples, "INOPO" is a measure of the degree of unsaturation, also known as the Iodine-Mercuric Acetate Method as reported in Ind. Eng. Chem. 40, 1277 (1948). The abbreviation TEAL is used for tri-ethyl aluminum. $\overline{M}v$ is the viscosity average molecular weight of the polymers, based on a dilute solution viscosity measurement in diisobutylene at 68° F.

EXAMPLE 1

| Run Number | MeOH ADDED | TEAL ADDED | BUTYL ANALYSIS $\overline{M}v$ | INOPO |
|---|---|---|---|---|
| 1 | None | None | 971,500 | 7.7 |
| 2 | 12.6 ppm | None | 486,500 | 6.7 |
| 3 | 12.6 ppm | 58.1 ppm | 941,000 | 7.3 |
| 4 | None | 58.1 ppm | 962,100 | 7.4 |
| 5 | None | None | 945,000 | 7.3 |

The results clearly show that addition of 12.6 ppm of methanol strongly depresses polymer molecular weight from more than 900,000 to less than 500,000; whereas addition of 58.1 ppm of tri-ethyl aluminum (TEAL) as a buffering or complexing agent has essentially no effect on molecular weight by itself, but that its presence prevents the methanol from causing a molecular weight depression (i.e., the molecular weight of run 3 of the series with both methanol and TEAL present is the same as that of the controls, 1 or 5, with no methanol present).

EXAMPLE 2

| Run Number | ACETONE ADDED | TEAL ADDED | BUTYL ANALYSIS $\overline{M}v$ | INOPO |
|---|---|---|---|---|
| 1 | None | None | 705,000 | 7.5 |
| 2 | 24.5 ppm | None | 334,000 | 8.1 |
| 3 | None | 81.3 ppm | 835,000 | 7.8 |
| 4 | 24.5 ppm | 81.3 ppm | 765,000 | 7.1 |
| 5 | None | None | 725,000 | 7.6 |

The results show that addition of 24.5 ppm acetone strongly depresses molecular weight from more than 700,000 to 334,000; addition of TEAL alone at 81.3 ppm causes a small molecular weight increase, and that addition of acetone to the buffered system containing TEAL has little effect on molecular weight. TEAL is able to counteract or prevent the molecular weight depression caused by acetone just as it was effective with methanol in example 1. TEAL is an effective buffer with acetone as it is with methanol.

EXAMPLE 3

| Run No. | DIMETHYL ETHER ADDED | TEAL ADDED | BUTYL ANALYSIS $\overline{M}v$ | INOPO |
|---|---|---|---|---|
| 1 | None | None | 705,000 | 7.5 |
| 2 | 10.7 ppm | None | 457,900 | 8.3 |
| 3 | None | 81.3 | 835,000 | 7.8 |
| 4 | 10.7 ppm | 40.7 ppm | 705,100 | 7.8 |
| 5 | None | None | 725,000 | 7.6 |

These results show that dimethyl ether is a severe molecular weight poison when TEAL is not present but that its effect is nullified in the buffered system contaning TEAL.

EXAMPLE 4

A series of batch polymerization runs was made following the procedures outlined above using tertiary butyl alcohol as the poison with the following results:

| Run No. | t-BuOH ADDED | TEAL ADDED | BUTYL ANALYSIS $\overline{M}v$ | INOPO |
|---|---|---|---|---|
| 1 | None | None | 830,000 | 7.9 |
| 2 | 25.1 ppm | None | 650,000 | 8.3 |
| 3 | None | 65.0 ppm | 850,000 | 7.8 |
| 4 | 25.1 ppm | 65.0 ppm | 817,000 | 7.6 |
| 5 | None | None | 800,000 | 8.0 |

The results show that t-butanol is a strong molecular weight depressant with no TEAL present by that it has little effect in a buffered system containing TEAL.

Examples 1 to 4 show that when an effective buffering agent like TEAL is used at proper concentrations relative to catalyst and poisons, and is added properly, it is able to prevent all classes of oxygenated bases from adversely affecting the butyl polymerization. In these examples the TEAL was added at a molar excess to the poison but at less than 1 mole per mole of $AlCl_3$ catalyst. The TEAL was added to the cold feed blend at $-140°$ F. and allowed to complex with the poison before catalyst was added to initiate polymerization. Only a short residence time (several minutes) was allowed between complex formation and initiation of polymerization.

EXAMPLE 5

This example is provided to demonstrate that the buffering agent is not effective against molecular weight depressants unless it is present in a molar excess in relation to the amount of polymerization poison in the system.

| RUN No. | MeOH ADDED | TEAL ADDED | MOLE TEAL/ MOLE MeOH | BUTYL ANALYSES $\overline{M}v$ | INOPO |
|---|---|---|---|---|---|
| 1 | None | None | — | 848,500 | 7.8 |
| 2 | 12.6 ppm | None | — | 469,400 | 7.6 |
| 3 | 12.6 ppm | 8.2 ppm | 0.18 | 381,700 | 7.3 |
| 4 | 12.6 ppm | 16.5 ppm | 0.37 | 442,000 | 7.6 |
| 5 | 12.6 ppm | 41.0 ppm | 0.87 | 863,600 | 7.3 |
| 6 | 12.6 ppm | 57.4 ppm | 1.28 | 883,800 | 7.8 |
| 7 | 12.6 ppm | 121.7 ppm | 2.75 | 924,000 | 7.7 |
| 8 | None | 123.5 ppm | — | 843,500 | 7.8 |
| 9 | None | None | — | 810,000 | 7.4 |

The data show that TEAL is ineffective in preventing the molecular weight depression caused by methanol unless there are about as many moles of TEAL present as there are moles of methanol. Excess TEAL is not harmful provided (as shown in later Example 7) its molar ratio to $AlCl_3$ is not too high. Apparently TEAL is effective at a level of about 1/1 molar relative to the polymerization poison.

EXAMPLE 6

The data in these experiments show that the buffering or complexing agent, in this case TEAL, is not effective if the residence or storage time prior to initiating polymerization in the polymerization reactor is too long or if the residence time is at too high a temperature.

| RUN No | MeOH ADDED | TEAL ADDED | STORAGE TIME @ $-70°$ C. | $\overline{M}v$ | INOPO |
|---|---|---|---|---|---|
| 1 | None | None | None | 877,000 | 7.8 |
| 2 | 12.5 ppm | None | None | 576,000 | 8.4 |
| 3 | 12.5 ppm | None | 3½ hrs. | 612,000 | 8.7 |
| 4 | 12.5 ppm | 58 ppm | None | 864,000 | 9.0 |

-continued

| RUN No | MeOH ADDED | TEAL ADDED | STORAGE TIME @ −70° C. | $\overline{M}v$ | INOPO |
|---|---|---|---|---|---|
| 5 | 12.5 ppm | 58 ppm | 3½ hrs. | 414,000 | 8.4 |

These data show that methanol is a strong molecular weight depressant without TEAL present and that storing the feed with only methanol present has no further effect. The data from run 4 show that methanol has no adverse effect in the buffered system containing TEAL, but the data from run 5 show that TEAL completely loses its buffering ability when the feed containing methanol and TEAL is stored for 3½ hours at −70° C. before adding catalyst to initiate polymerization.

| RUN No. | MeOH ADDED | TEAL ADDED | STORAGE TIME | $\overline{M}v$ | INOPO |
|---|---|---|---|---|---|
| 6 | None | None | None | 803,000 | 8.1 |
| 7 | 12.7 ppm | None | None | 555,000 | 8.0 |
| 8 | 12.7 ppm | 58 ppm | None | 925,000 | 7.8 |
| 9 | 12.7 ppm | 58 ppm | 4½ hr @ 20° C. | 459,000 | 8.1 |
| 10 | 12.7 ppm | 58 ppm | 4 hrs @ −70° C. | 395,000 | 7.8 |
| 11 | 12.7 ppm | 58 ppm | 1 hr @ −95° C. | 361,000 | 8.5 |

These data again show that methanol is a strong molecular weight depressant but that its adverse effects can be completely prevented in the buffered system containing TEAL. However, molecular weight is severely depressed if the buffered system is stored at 20° C., −70° C. or even −95° C. before catalyst is added to cause polymerization. These data show that TEAL forms an effective buffered system only when it is added to the cold feed immediately before polymerization is started.

| RUN NO | ACETONE ADDED | TEAL ADDED | STORAGE TIME | $\overline{M}v$ | INOPO |
|---|---|---|---|---|---|
| 13 | None | None | None | 700,000 | 7.8 |
| 14 | 24.5 ppm | None | None | 334,000 | 8.3 |
| 15 | None | 81.3 ppm | None | 836,000 | 7.8 |
| 16 | 24.5 ppm | 81.3 ppm | None | 756,000 | 7.8 |
| 17 | 24.5 ppm | 81.3 ppm | 1 hr @ −100° C. | 255,000 | 8.4 |

These data show that acetone is a strong molecular weight depressant but that it has no adverse effect in a buffered system containing TEAL. However, molecular weight in the buffered system is severely depressed when the feed blend containing acetone plus TEAL is stored 1 hour at −100° C. before polymerization.

| RUN NO. | ACETONE ADDED | TEAL ADDED | STORAGE TIME | $\overline{M}v$ | INOPO |
|---|---|---|---|---|---|
| 18 | None | None | None | 830,000 | 7.6 |
| 19 | 24.9 ppm | None | None | 453,000 | 8.3 |
| 20 | 24.9 ppm | 81.3 ppm | None | 802,000 | 7.6 |
| 21 | 24.9 ppm | 81.3 ppm | 5 hrs @ 20° C. | 673,000 | 7.5 |
| 22 | 24.9 ppm | 81.3 ppm | 1 hr @ −99° C. | 680,000 | 7.5 |

These data again show that acetone is a severe molecular wight depressant but that its adverse effect is completely negated in the buffered system containing TEAL. However, if the buffered system is stored as in runs 21 and 22 prior to polymerization then TEAL Loses effectiveness and molecular weight is depressed.

| RUN NO. | POISON ADDED* | TEAL ADDED** | STORAGE TIME | $\overline{M}v$ | INOPO |
|---|---|---|---|---|---|
| 23 | 0 | None | None | 662,000 | 7.0 |
| 24 | 12 ppm | None | None | 439,000 | 7.1 |
| 25 | 12 ppm | 1.2 | None | 640,000 | 6.8 |
| 26 | 12 ppm | 1.2 | 1 hr @ −97 | 405,000 | 6.7 |
| 27 | 12 ppm | 1.2 | None*** | 646,000 | 7.4 |

*Poison was 4 ppm each of methanol, acetone, and dimethyl ether.
**TEAL was added at 1.2 moles per mole of total poisons added.
***No storage time prior to polymerization but 15 min. residence time @ −95° C. after initiation and before completion of polymerization.

These data show that molecular weight was severely depressed by adding the mixed poisons to the unbuffered feed (Run 24) but unaffected in the buffered feed (Run 25). Storage of the buffered feed prior to initiating polymerization caused the TEAL to lose its effectiveness (Run 26); but allowing residence time in the reactor after polymerization had been started (as in run 27) had no adverse effect on buffering ability. These data show that TEAL is an effective buffering agent when properly used.

The data from all these experiments show that TEAL must be used properly in order to be an effective buffering agent. It is effective only when added to cold feed immediately before polymerization. It loses effectiveness if the feed is warm or is stored with TEAL present prior to polymerization.

EXAMPLE 7

This example is provided to demonstrate that the molar raio of buffering agent to catalyst affects both polymer molecular weight and catalyst efficiency at a level significantly greater than about 1:1. Here TEAL and AlCl₃ were used.

| RUN No. | MOLAR RATIO TEAL/ AlCl₃ | RELATIVE MOLECULAR WEIGHT WITH TEAL vs. CONTROL WITH NO TEAL | RELATIVE CATALYST EFFICIENCY WITH TEAL vs. CONTROL WITH NO TEAL |
|---|---|---|---|
| 1 | 0.16 | 1.04 | 1.0 |
| 2 | 0.20 | 1.11 | 0.9 |
| 3 | 0.42 | 1.01 | 0.8 |
| 4 | 0.62 | 1.08 | 0.8 |
| 5 | 1.05 | 1.13 | 0.7 |
| 6 | 2.01 | 0.09 | 0.15 |

The data show that addition of TEAL to pure feed (as free of oxygenated impurities as possible) has only a mild beneficial effect on molecular weight and a mild negative effect on catalyst efficiency until significantly more than one mole of TEAL per mole of AlCl₃ is added, then molecular weight and catalyst efficiency fall off rapidly. In this example a 5% molar excess had not yet reduced molecular weight, but caused a 30% reduction in catalyst efficiency. At a 2/1 molar ratio of TEAL/AlCl₃ molecular weight is less than 10% of the control molecular weight and catalyst efficiency has been reduced by nearly a factor of six. The operating window over which TEAL is effective as a buffer is defined by the amount of poisons present and the amount of AlCl₃ catalyst used. The buffering agent becomes effective at some lower level where the amount added on a molar basis just exceeds the total amount of poisons present and it ceases to be effective at some upper level where the amount added on a molar basis significantly exceeds the amount of AlCl3 catalyst used.

EXAMPLE 8

This example is included for the purposes of comparison and demonstrates the criticality of the buffering agents claimed in accordance with this invention. In this example, tri-isobutyl aluminum (TIBAL) was found to be ineffective as a buffering agent. The poisons added here were t-butanol (TBOH) and methanol.

| RUN No. | TBOH ADDED | TIBAL ADDED | RATIO MOLE TIBAL/ MOLE TBOH | $\overline{Mv}$ | INOPO |
|---|---|---|---|---|---|
| 1 | None | None | — | 487,000 | 8.3 |
| 2 | 26 ppm | None | — | 249,000 | 8.4 |
| 3 | 52 ppm | None | — | 226,000 | 8.4 |
| 4 | 26 ppm | 110 ppm | 1.6 | 240,000 | 8.7 |
| 5 | 52 ppm | 220 ppm | 1.6 | 244,000 | 9.0 |

These data show that t-butanol causes a severe molecular weight depression whether or not TIBAL is present.

Results of a series of runs with methanol as the poison and TIBAL evaluated as a buffering agent are shown below:

| RUN No. | MeOH ADDED | TIBAL ADDED | RATIO MOLE TIBAL/ MOLE MeOH | $\overline{Mv}$ | INOPO |
|---|---|---|---|---|---|
| 6 | None | None | — | 908,000 | 7.9 |
| 7 | None | 111 ppm | — | 619,000 | 8.4 |
| 8 | 9 ppm | None | — | 522,000 | 8.2 |
| 9 | 9 ppm | 111 ppm | 1.0 | 547,000 | 8.3 |

Methanol causes a severe molecular weight depression whether or not TIBAL is present; and in fact the data from run 7 show that addition of TIBAL by itself causes a molecular weight depression. The effect of TIBAL alone is also quite different from the effect of TEAL alone as shown in the data of example 7. TEAL alone tends to raise molecular weight whereas TIBAL alone depresses it.

EXAMPLE 9

This example is also included for the purpose of comparison and further demonstrates the criticality of the buffering agents claimed in accordance with this invention. In this example, diethyl aluminum chloride (DEAC) was found ineffective as a buffering agent despite its similarity to the buffering agents claimed in accordance with the present invention. TBOH is t-butanol; DME is dimethyl ether.

| RUN No. | POISON (BASE) | BUFFERING AGENT | RATIO MOLES DEAC/ MOLE BASE | $\overline{Mv}$ |
|---|---|---|---|---|
| 1 | None | None | Control Run | 836,000 |
| 2 | None | 82 ppm DEAC | Buffer only | 944,000 |
| 3 | 25 ppm TBOH | None | Poison only | 481,000 |
| 4 | 25 ppm TBOH | DEAC | 1.5 Moles/Mole | 436,000 |
| 5 | 11 ppm DME | None | Poison only | 593,000 |
| 6 | 11 ppm DME | DEAC | 1.4 Moles/Mole | 339,000 |
| 7 | 25 ppm Acetone | None | Poison only | 334,000 |
| 8 | 25 ppm Acetone | DEAC | 1.1 Moles/Mole | 408,000 |

These data show that DEAC by itself does behave similarly to TEAL in that it has a mild beneficial effect on polymer molecular weight but that DEAC is completely ineffective as a buffering agent with various oxygenated bases. Acetone, dimethyl ether, and t-butanol all severely depress butyl molecular weight whether or not DEAC is present as a buffering agent. Thus DEAC, like TIBAL, is not suitable as a buffering agent during butyl polymerization.

EXAMPLE 10

This example demonstrates the utility of trimethyl aluminum (TMAL) as a buffering agent in accordance with the present invention.

| RUN No. | POISON ADDED | TMAL ADDED | RATIO MOLE TMAL/ MOLE POISON | $\overline{Mv}$ | INOPO |
|---|---|---|---|---|---|
| 1 | None | None | Control | 891,000 | 8.1 |
| 2 | None | 41.6 ppm | TMAL only | 969,000 | 7.8 |
| 3 | 12.8 ppm MeOH | None | MeOH only | 763,000 | 8.1 |
| 4 | 12.8 ppm MeOH | 58 ppm | 2.03 | 967,000 | 7.7 |
| 5 | 24.9 ppm Acetone | None | Acetone Only | 509,000 | 7.6 |
|   | 24.9 ppm Acetone | 56 ppm | 1.84 | 790,000 | 7.4 |

These data show that methanol or acetone severely depress polymer molecular weight when added to the control polymerization but that the molecular weight depression is largely prevented when these same poisons are added to buffered feed containing TMAL. TMAL is an effective buffering agent when added to cold butyl feed immediately before polymerization.

Another series of batch polymerizations similar to those of example 1 were run with dimethyl ether as the poison and TMAL as the buffering agent. Some of the buffered feeds were also stored prior to initiating polymerization as in example 6 to determine whether TMAL loses effectiveness if feeds containing it are stored prior to polymerization.

| RUN | DME ADDED | TMAL ADDED | RATIO MOLE TMAL/ MOLE DME | STORAGE TIME | $\overline{Mv}$ | INOPO |
|---|---|---|---|---|---|---|
| 7 | None | None | Control | None | 589,000 | 8.2 |
| 8 | 34.5 ppm | None | DME only | None | 315,000 | 7.9 |
| 9 | 34.5 ppm | 78.7 ppm | 1.45 | None | 621,000 | 7.9 |
| 10 | 34.5 ppm | 78.7 ppm | 1.45 | 4 hr @ | 424,000 | 8.3 |

| | | | −78° C. | | |

These data show that addition of dimethyl ether to the control polymerization severely depresses polymer molecular weight but that molecular weight depression is prevented when dimethyl ether is added to buffered feed containing TMAL. However, if the buffered feed is stored for significant periods prior to polymerization, as in run 8, then TMAL loses effectiveness as a buffering agent and is not longer able to prevent dimethyl ether fromm depressing butyl molecular weight. These data show that TMAL is an effective buffering agent for butyl polymerization, but that like TEAL, it must be used in the proper way in order to be effective.

EXAMPLE 11

This example demonstrates the utility of diisobutyl aluminum hydride (DIBAL-H) as a buffering agent in accordance with the present invention.

| RUN No. | DIMETHYL ETHER ADDED | DIBAL H ADDED | RATIO MOLES DIBAL H/ MOLE ETHER | $\overline{Mv}$ | INOPO |
|---|---|---|---|---|---|
| 11 | None | None | Control | 589,000 | 8.2 |
| 12 | 34.5 ppm | None | Ether only | 315,000 | 7.9 |
| 13 | 34.5 ppm | 15.2 ppm | 1.43 | 678,000 | 7.1 |

These data show that DIBAL H is an effective buffering agent to prevent the harmful effects of dimethyl ether on butyl polymerization.

All of these data show that DIBAL H, like TEAL and TMAL, is an effective buffering agent for butyl polymerization when used in a proper manner. These buffering agents counteract or prevent the adverse ef-

| RUN No. | POISON ADDED | BUFFERING AGENT ADDED | RATIO MOLE BUFFER/ MOLE POISON | $\overline{Mv}$ | INOPO |
|---|---|---|---|---|---|
| 1 | None | None | Control | 635,000 | 8.6 |
| 2 | None | 87.4 ppm DIBAL H | DIBAL H only | 753,000 | 8.6 |
| 3 | 24.2 ppm Acetone | None | Acetone Only | 424,000 | 8.2 |
| 4 | 24.2 ppm Acetone. | 87.4 ppm DIBAL H | 1.48 | 671,000 | 8.6 |
| 5 | 24.2 ppm Acetone | 63.4 ppm TEAL | 1.33 | 668,000 | 7.8 |
| 6 | 12.3 ppm Methanol | None | Methanol Only | 487,000 | 8.5 |
| 7 | 12.3 ppm Methanol | 87.4 ppm DIBAL H | 1.60 | 860,000 | 8.1 |

These data show that methanol or acetone severely depress butyl molecular weight when added to the control polymerization but that the molecular weight depression is prevented when these same poisons are added to buffered feed containing a molar excess of DIBAL H or TEAL. DIBAL H in run 4 is as effective in preventing molecular weight loss caused by acetone as is TEAL in run 5. The data also show that DIBAL H alone (run 2) tends to raise butyl molecular weight as compared to the control rather than depress it. Both in terms of buffering effectiveness and molecular weight effect, DIBAL H behaves much more like TEAL than tri-isobutyl aluminum.

| RUN No. | t- ADDED | H ADDED | RATIO MOLES DIBAL H/ MOLES t- MOLES BUTANOL | $\overline{Mv}$ | INOPO |
|---|---|---|---|---|---|
| 8 | None | None | Control | 745,000 | 8.5 |
| 9 | 23 ppm | None | t-butanol only | 237,000 | 9.0 |
| 10 | 23 ppm | 66.2 ppm | 1.50 | 755,000 | 8.1 |

These data show that t-butanol severely depresses molecular weight when added to the control but has no effect when added to buffered feed containing a molar excess of DIBAL H. DIBAL H is indicated to be an effective buffering agent to prevent the harmful effects of t-butanol on butyl polymerization.

fects which "poisons" have on butyl polymerization. Their use results in an improved polymerization process.

EXAMPLE 12

In order to confirm the advantages of this invention under actual plant conditions, a series of tests were run in a large scale butyl reactor to show that the deleterious effects of traces of poisons and/or activators in the butyl feed could be negated by the appropriate use of complexing or buffering agents. These tests were run using a conventional large scale butyl reactor which had been equipped with auxiliary equipment to permit injecting controlled and measured amounts of poisons, activators, and buffering agents into the reactor feed. The reactor was of the conventional draft tube design. Reactor contents were circulated by a bottom entering propeller pump centered in the draft tube. The reactor was cooled by circulating liquid ethylene to the jackets where it vaporized to provide refrigeration. Reactor temperature was maintained at the lowest level the facilities would permit and warmed slowly during a run as the reactor fouled. Warm-up rate is a measure of the fouling rate. All tests were made at a constant feed rate with a residence time of about 40 minutes. The reactor effluent overflowed into a flash tank to which steam and hot water were added for recovery of the butyl rubber as a slurry in water. Unreacted monomers were flashed overhead for recycle.

The tests were carried out by establishing steady state conditions and then beginning continuous injection of the desired poison/activator and/or buffering agent at a controlled and measured rate. After a new "test" steady state was established, the effects of the injected agents were determined by comparing the steady state reactor conditions before, during, and after the test injection. Tests were usually run at constant monomer conversion by adjusting catalyst rate to correct for the effect of the injected agent on catalyst activity, but all other parameters were maintained as constant as possible during a series of tests so that the effects of the injected agent could be clearly ascertained. Control reactors were being operated simultaneously with the test reactor so that perturbations caused by uncontrolled variations in the plant could be observed and not erroneously ascribed to the injected agent.

The feed chilling facilities included two stages of ethylene refrigerated heat exchangers. The auxiliary facilities for injection of agents were built so that the poison or activator was injected into the reactor feed at the inlet of the first ethylene feed chiller whereas the buffering agent was injected downstream of this point at the inlet of the second ethylene feed chiller. This was done in order to conform to conditions which the laboratory glassware studies had shown where necessary in order to achieve effective buffering. In this way, the buffering agent was injected into the cold "poisoned" feed with a contact time of only several seconds before entering the reactor where polymerization was being continuously carried on.

Data from a test series which show the adverse effects of injecting methanol into the reactor feed and then the negating of these effects by injecting TEAL downstream of the methanol are summarized below. Feed rate to the reactor was 6655 Kg/hr. of a feed containing 31.5% by weight isobutylene and 0.82% by weight isoprene in methyl chloride. During the test period methanol was injected into the feed at 0.129 kg/hr.=4.03 moles/hr.=19 ppm by weight on feed. During the TEAL injection period, TEAL was injected downstream of the methanol at 0.854 Kg/hr.=7.5 moles/hr.=128 ppm by weight on feed. The molar ratio of TEAL to methanol during the test was thus 1.86. Data from the various steady-state periods of the test series are summarized below. Reactor Index is defined as Butyl product Mooney viscosity divided by the isobutylene content of the reactor liquid phase.

| SUMMARY RESULTS-METHANOL FOLLOWED BY TEAL TEST SERIES | | | | |
|---|---|---|---|---|
| | BEFORE TEST | +MeOH | +MeOH & TEAL | AFTER TEST |
| Mooney Viscosity of Butyl | 60 | 49 | 60 | 60 |
| Reactor Index | 11.7 | 9.8 | 10.7 | 10.5 |
| Unreacted Isobutylene, % | 5.1 | 5.0 | 5.6 | 5.7 |
| Isobutylene Conversion % | 87.3 | 87.3 | 86.0 | 85.8 |
| $AlCl_3$ Rate, | | | | |
| Kg/hr. | 1.374 | 1.642 | 1.79 | 1.25 |
| Mole/hr. | 10.3 | 12.3 | 13.4 | 9.36 |
| $AlCl_3$ Efficiency, W/W | 1330 | 1115 | 1003 | 1439 |
| Warm-up Rate, °C./hr. | 0.12 | 0.085 | 0.006 | 0.14 |

In this test series the reactor was brought to a steady-state operation and operating conditions were measured and recorded; then methanol injection was started and catalyst rate was adjusted to try to maintain conversion of isobutylene approximately constant. The reactor was equilibrated at a new steady-state which was measured and recorded; then the TEAL injection was begun downstream of the methanol. Catalyst rate was again adjusted to keep conversion about constant and the reactor was equilibrated at a third steady-state which was again measured and recorded; finally both the methanol and TEAL injections were stopped and catalyst rate was again adjusted to keep conversion constant and the reactor was equilibrated at a fourth steady-state. The first and fourth steady-states were both with no materials being purposely injected into the feed and represent the base case with which the test periods can be compared. Although both the initial and final steady-states represent the base case with no injections into the feed, they are not identical because the reaction had been on-stream for a long period by the time the fourth steady-state was reached. In the interim it had suffered considerable fouling and had warmed-up several degrees centigrade. Because it takes at least six hours to line a reactor out at a new steady-state after a change is made, the reactor had been in production at least 24 hours by the time the fourth steady-state was reached. In general, as a reactor fouls and warms, certain trends can be expected:

1. Catalyst efficiency tends to increase slowly (note the initial catalyst efficiency was 1330 and the final 1440).
2. The warm-up rate tends to rise at an ever accelerating rate (note the initial warm-up rate is 0.12° C. per hour and the final 0.14° C. per hour).
3. Reactor index which is simply the ratio of Mooney to unreacted isobutylene tends to decrease slightly (note the initial index is 11.7 and the final 10.5). Reactor index is one measure of the performance of a reaction system in terms of the absence of poisoning effects with a high index being preferred.

It is important to be aware of these trends as the reactor ages in interpreting the data.

A comparison of the before test period with the period during methanol injection shows that methanol severely depresses Mooney viscosity (a measure of polymer molecular weight) and reactor index as well as decreasing catalyst activity. These changes are undesirable and if they occurred due to random fluctuations in the feed methanol level would make it very difficult to control the reactor and produce specification butyl rubber. Data from the period of simultaneous injection of methanol and TEAL show that injection of the TEAL has counteracted the adverse effect of methanol on Mooney viscosity and reactor index. A comparison of this steady-state with the final steady-state after stopping the injection of both agents shows that the TEAL has completely prevented the methanol from depressing Mooney viscosity or reactor index. Clearly injection of methanol has severely affected the reactor but it has little effect in the buffered reactor containing TEAL.

TEAL does not counteract the adverse effect of methanol on catalyst efficiency because as is shown later TEAL itself depresses catalyst efficiency, but this is not a significant practical problem. It is also apparent though that introduction of methanol and TEAL has a favorable effect in reducing the rate of reactor warm-up which is highly desirable. This favorable effect of TEAL is demonstrated further in later examples.

These data show then that TEAL is an effective buffering agent under large scale butyl production conditions and that it is able to counteract the adverse effects of methanol on polymer molecular weight and reactor index. Furthermore, it is shown to have a beneficial effect on reactor warm-up rate.

EXAMPLE 13

Another series of plant tests were run in a manner similar to that described in example 12 to confirm the effectiveness of TEAL as a buffering agent against the adverse effects of methanol in a butyl polymerization reactor. In this series of tests though, the TEAL was injected into the reactor first and then the methanol was injected to evaluate the effects of methanol in the buffered reactor containing TEAL. The injection points were as in example 12 with the TEAL being injected into the cold feed downstream of the methanol and immediately before entering the reactor. For this series of tests, feed rate into the reactor was 6655 Kg/hr. of a feed containing 32.4% by weight isobutylene and 0.84% by weight isoprene in methyl chloride. As in example 12, TEAL was injected into the feed at 0.854 Kg/hr. and methanol at 0.129 Kg/hr. during the injection periods. The molar ratio TEAL/methanol was again 1.86. Data from the various steady-state portions of this test series are summarized below:

| SUMMARY RESULTS - TEAL FOLLOWED BY METHANOL TEST SERIES | | | | |
|---|---|---|---|---|
| | BEFORE TEST | +TEAL | +TEAL & MeOH | AFTER TEST |
| Mooney Viscosity | 60 | 62 | 59 | 58 |
| Reactor Index | 10.5 | 10.9 | 10.5 | 10.0 |
| Unreacted Isobutylene, % | 5.7 | 5.7 | 5.6 | 5.8 |
| Isobutylene Conversion, % | 86.4 | 86.0 | 86.3 | 86.1 |
| AlCl$_3$ Rate, | | | | |
| Kg/hr. | 1.13 | 1.68 | 1.70 | 0.96 |
| Mole/hr. | 8.44 | 12.59 | 12.73 | 7.18 |
| AlCl$_3$ Efficiency, W/W | 1655 | 1103 | 1095 | 1930 |
| Warm-up Rate, °C./hr. | 0.14 | 0.23 | 0.17 | 0.68 |

In this test series the reactor was again equilibrated at four separate steady-state conditions as in example 12 with catalyst rate adjustments being made after each change to keep conversion approximately constant. The reactor was first equilibrated in normal operation, then with TEAL being injected, then with TEAL and methanol being injected, and finally again with the injection of both agents stopped.

The data show that injection of TEAL alone has a mild beneficial effect on Mooney viscosity and reactor index as in the laboratory tests and causes a significant (although unimportant) drop in catalyst efficiency. Then injection of methanol into the reactor containing TEAL was begun and had almost no effect at all. The buffered reactor to which TEAL was being injected was virtually unaffected by the methanol. This is in sharp contrast to the effect of methanol injection into an unbuffered reactor as in example 12. Simultaneous removal of the TEAL and methanol again had no appreciable effect on Mooney viscosity or reactor index, although catalyst efficiency of course rose sharply. Reactor warm-up rate again rose sharply also when the TEAL and methanol were removed, showing their beneficial effect on this important parameter. Clearly these data show that TEAL is an effective buffering agent under large scale polymerization conditions to prevent methanol from adversely affecting reactor performance. Variations in the methanol level of a feed to a buffered reactor containing TEAL would not upset the reactor in any way whereas similar variations in the methanol level of the feed to an unbuffered butyl reaction system would greatly upset the reactor and cause off-specification rubber to be produced and reactor control to become difficult.

EXAMPLE 14

A series of large scale tests similar to those described in examples 12 and 13 were run to confirm the effectiveness of TEAL as a buffering agent to counteract the adverse effects of acetone in a butyl polymerization reactor. In this series of tests, acetone was injected into the equilibrated reactor to measure its adverse effect. This was followed by a period in which TEAL and acetone were injected simultaneously to determine whether TEAL could negate the adverse effects of acetone. Feed rate into the reactor for this series of tests was 6542 Kg/hr. of a feed containing 32.0% isobutylene and 0.83% isoprene by weight in methyl chloride. Acetone was injected at 0.22 Kg/hr.=3.77 moles/hr.=33 ppm on feed and TEAL was injected at 0.854 Kg/hr.=7.5 moles/hr.=130 ppm on feed during the injection periods. The molar ratio of TEAL/acetone was 1.99. Data from the various steady-state portions of this test series are summarized below:

| SUMMARY RESULTS-ACETONE FOLLOWED BY TEAL TEST SERIES | | | | |
|---|---|---|---|---|
| | BEFORE TEST | +ACETONE | +ACETONE & TEAL | AFTER TEST |
| Mooney Viscosity | 68 | 59 | 70 | 64 |
| Reactor Index | 10.5 | 9.4 | 10.5 | 10.5 |
| Unreacted Isobutylene, % | 6.5 | 6.3 | 6.7 | 6.1 |
| Isobutylene Conversion, % | 84.0 | 84.3 | 82.7 | 85.2 |
| AlCl$_3$ Rate, | | | | |
| Kg/hr. | 1.14 | 1.40 | 1.74 | 0.95 |
| Mole/hr. | | | | |
| AlCl$_3$ Efficiency, W/W | 1540 | 1256 | 990 | 1870 |
| Warm-up Rate, °C./hr. | 0.085 | 0.10 | 0.14 | 0.27 |

These data show that injection of acetone into the equilibrated reactor severely depressed Mooney viscosity, reactor index, and catalyst efficiency. A random variation in the acetone level of the feed to a butyl reactor would severely upset the reactor and result in off-specification production. Injection of TEAL downstream of the acetone completely counteracted its deleterious effects on Mooney viscosity and reactor index (but not on catalyst efficiency as already explained). Simultaneous removal of the TEAL and acetone had no effect on reactor index (and would have had no effect on Mooney viscosity if isobutylene conversion had been held constant). Again it is clear that TEAL is an effective buffering agent to counteract the adverse effects of acetone in a butyl reaction system. Introduction of acetone into a buffered reactor containing TEAL would have little effect on the reactor performance or product.

EXAMPLE 15

A series of large scale tests similar to those already described was run to confirm the effectiveness of TEAL as a buffering agent against the adverse effects of diethyl ether in a butyl polymerization reactor. In this series of tests, TEAL was injected into the reactor first and then the diethyl ether was injected to evaluate the effects of the ether in the buffered reactor containing TEAL. The injection points were as previously described with the TEAL being injected into the cold feed downstream of the ether injection point and immediately before entering the reactor. The feed rate for this series of tests was 6542 Kg/hr. of a feed containing 30.4% isobutylene and 0.79% isoprene by weight in methyl chloride. TEAL was injected into the feed at a rate of 0.69 Kg/hr.=6.1 moles/hr.=105 ppm on feed and diethyl ether was injected at 0.288 Kg/hr.=3.89 moles/hr.=44 ppm on feed during the injection periods. The molar ratio of TEAL/ether was 1.57. As in the previous tests, the reactor was again equilibrated at four separate steady-state conditions with catalyst rate adjustments being made after each change to keep isobutylene conversion approximately constant. The reactor was first equilibrated in normal operation, then with TEAL being injected, then with TEAL and diethyl ether being injected simultaneously, and finally with the injection of both agents stopped. Data from the four steady-state portions of this test series are summarized below:

| SUMMARY RESULTS-TEAL FOLLOWED BY DIETHYL ETHER TEST SERIES | | | | |
|---|---|---|---|---|
| | BEFORE TEST | +TEAL | +TEAL & DIETHYL ETHER | AFTER TEST |
| Mooney Viscosity | 64 | 68 | 64 | 65 |
| Reactor Index | 11.6 | 11.7 | 11.2 | 11.4 |
| Unreacted Isobutylene, % | 5.5 | 5.8 | 5.7 | 5.7 |
| Isobutylene Conversion, % | 85.5 | 84.3 | 84.5 | 85.1 |
| AlCl$_3$ Rate, Kg/hr mole/hr. | 1.20 | 1.84 | 1.84 | 1.18 |
| AlCl$_3$ Efficiency, W/W | 1410 | 912 | 915 | 1440 |
| Warm-Up Rate, °C./hr. | 0.09 | 0.05 | 0.07 | 0.13 |

The data show that introduction of TEAL alone had a very mild beneficial effect on Mooney viscosity and reactor index and caused a substantial drop in catalyst efficiency. Then introduction of the diethyl ether into the reactor buffered by TEAL had almost no effect at all. TEAL was very effectively buffering the reactor against the adverse effects of diethyl ether so its introduction did not upset the reactor in any way. In a comparison test, the results of which are shown below, introduction of diethyl ether into a reactor not protected by the buffering action of TEAL sharply depressed Mooney viscosity and reactor index, and resulted in poor quality butyl rubber. Simultaneous removal of the TEAL and ether again had no effect on Mooney viscosity or reactor index showing that the TEAL was preventing the ether from depressing these parameters. Catalyst efficiency of course did jump when the buffering agent and poison were removed. These data again show that TEAL is an effective buffering agent under large scale polymerization conditions to prevent diethyl ether from adversely affecting reactor performance. The buffered reactor containing TEAL had been rendered insensitive to variations in the ether level in the feed and would not be upset by the natural feed quality variations which occur from time to time.

Data from the comparison test showing the effects of diethyl ether injection into a normal, unbuffered reactor are shown below. In this test feed rate was 6542 Kg/hr. of feed containing 32.5% isobutylene and 0.84% isoprene by weight in methyl chloride. The diethyl ether was injected at 0.25 Kg/hr.=3.4 mole/hr.=38.5 ppm on feed.

| SUMMARY RESULTS-DIETHYL ETHER EFFECTS | | |
|---|---|---|
| | BEFORE TEST | +DIETHYL ETHER |
| Mooney Viscosity | 55 | 46 |
| Reactor Index | 10 | 8.5 |
| Unreacted Isobutylene, % | 5.5 | 5.4 |
| Isobutylene Conversion, % | 87.1 | 87.2 |
| AlCl$_3$ Rate, Kg/hr. Mole/hr. | 1.04 | 1.30 |
| AlCl$_3$ Efficiency, W/W | 1780 | 1420 |
| Warm-up Rate, °C./hr. | 0.17 | 0.14 |

The data show that injection of ether into the normal, unprotected reactor caused a severe depression in Mooney viscosity, reactor index, and catalyst efficiency and resulted in the production of off-specification butyl rubber.

Results of these plant tests 12 through 15 have shown that TEAL is an effective buffering agent for all classes of oxygenated poisons (alcohols, ketones, and ethers). It effectively prevents these poisons from affecting a butyl reactor so that stable on-specification production can be maintained despite fluctuations in the levels of these poisons in the feed. In addition, these data show that TEAL injection into the reactor has a beneficial effect in reducing the reactor warm-up rate, which has important economic consequences because a reduced warm-up rate permits extending run length and/or increasing polymer production rate without reducing achievable run length to an unacceptably low value.

EXAMPLE 16

Buffering against the effect of HCl in a butyl polymerization reaction was the purpose of this example. HCl is commonly referred to as a catalyst activator in the butyl process. It is known to depress Mooney viscosity and reactor index and to also dramatically increase catalyst efficiency and reactor warm-up rate when present in reactor feed. Increased catalyst efficiency is often desirable, but faster reactor warm-up is always undesirable because it limits run length and butyl production.

A series of large-scale tests was carried out following the procedures previously described. However, because of the very powerful effect HCl has on the reactor warm-up rate it was not possible to conduct a prolonged test to achieve a number of steady-state conditions in the same reactor as in the previous tests. Instead, the HCl tests were run one at a time and in some instances it is necessary to compare the reactor containing HCl with a side-by-side control reactor instead of comparing two different steady-states in the same reactor as in the previous examples.

The extremely deleterious effects that HCl has on butyl polymerization is shown by the results of the following experiment.

Anhydrous HCl gas was injected into the feed of an equilibrated reactor at 7.5 ppm by weight on the feed. The injection point was the same as that used for injection of the oxygenated poisons, at the inlet of the first ethylene feed chiller. As soon as the HCl gas injection was started, the reactor temperature began rising rapidly. It continued to rise rapidly accompanied by a sharp drop in unreacted isobutylene level despite all efforts to reduce catalyst rate into the reactor. It proved to be impossible to stabilize the reactor to achieve a new steady-state. Within less than one hour, the reactor temperature had risen by more than 5° C. and the reactor plugged so that it had to be taken out of production for cleaning. Clearly a random fluctuation in the HCl level in the feed of this magnitude would be severely deleterious to polymerization operations and could result in temperature run-away of all operating reactors.

Because the effects of HCl were so powerful that it was not possible to inject 7.5 ppm into the feed of a running reactor without causing it to "burn-up" and plug. An attempt was therefore made to initiate polymerization with HCl already present in the feed from the start. This technique permitted operation of a reactor containing HCl long enough to achieve a steady-state. However, it was not possible to remove the HCl and re-equilibrate the reactor without HCl to compare the two steady-states in the same reactor because of the rapid warmup rate. Therefore, the reactor containing HCl must be compared with another reactor running at the same time as a control reactor. Both reactor were operated in the same manner and at the same time except that anhydrous HCl was being injected into the feed of the test reactor at 7.5 ppm on feed. The feed rate to both reactors was the same at 6542 Kg/hr. of a feed containing 33% isobutylene and 0.86% isoprene by weight in methyl chloride. Steady-state conditions in the two reactors are compared below:

|  | TEST REACTOR WITH 7.5 ppm HCl | CONTROL REACTOR WITH NO HCl |
|---|---|---|
| Mooney Viscosity | 44 | 70 |
| Reactor Index | 9.4 | 12.5 |
| Unreacted Isobutylene, % | 4.7 | 5.6 |
| Isobutylene Conversion, % | 89.8 | 86.8 |
| AlCl$_3$ Rate, | | |
| Kg/hr. | 0.22 | 1.31 |
| Mole/hr. | 1.636 | 9.82 |
| AlCl$_3$ Efficiency, W/W | 8880 | 1430 |
| Warm-up Rate, °C./hr. | 1.2 | 0.1 |

The data show that the HCl was severely depressing Mooney viscosity and reactor index and causing a six-fold increase in catalyst efficiency. At the same time, reactor warm-up rate increased by a factor of 12 to 1.2° C./hr. In the five hour period necessary to achieve a steady-state, the test reactor had warmed more than 6° C. It plugged and had to be taken out of production for cleaning shortly after the HCl injection was stopped to try to re-establish an equilibrium without HCl. Clearly HCl in the feed has a disastrous effect upon reactor performance.

In another test, HCl and TEAL were injected simultaneously into an equilibrated reactor to confirm the effectiveness of TEAL as a buffering agent to prevent the harmful effects of HCl on the butyl polymerization. In this test, the reactor was equilibrated at normal conditions and then injection of HCl and TEAL was begun simultaneously into the feed to establish a new steady-state. A third steady-state was reached by discontinuing the injection of both agents. Feed rate to the reactor was 6542 kg/hr. of a feed containing 33.2% isobutylene and 0.86% isoprene by weight in methyl chloride. During the injection period, anhydrous HCl gas was injected at the first ethylene chiller at a rate of 0.042 Kg/hr. = 1.15 moles/hr. = 6.4 ppm on feed. TEAL was injected downstream of the HCl at the inlet of the second feed ethylene chiller into cold feed at a rate of 0.992 Kg/hr. = 8.7 moles/hr. = 152 ppm on feed. The molar ratio of TEAL/HCl was 7.57. Data from the various steady-state periods of this test series are summarized below:

| SUMMARY RESULTS - HCl/TEAL SIMULTANEOUS INJECTION | | | |
|---|---|---|---|
|  | BEFORE TEST | HCl AND TEAL SIMULTANEOUS | AFTER TEST |
| Mooney Viscosity | 57 | 65 | 59 |
| Reactor Index | 10.2 | 10.8 | 9.8 |
| Unreacted Isobutylene, % | 5.6 | 6.0 | 6.0 |
| Isobutylene Conversion, % | 86.9 | 85.9 | 85.9 |
| AlCl$_3$ Rate, | | | |
| Kg/hr. | 1.23 | 1.23 | 1.23 |
| Mole/hr. | 9.19 | 9.19 | 9.19 |
| AlCl$_3$ Efficiency, W/W | 1541 | 1524 | 1524 |
| Warm-up Rate, °C./hr. | 0.2 | 0.2 | 9.1 |
| Methanol, ppm on feed | 11 | 11 | 11 |

These data show that TEAL is an effective buffer to prevent the harmful effects of HCl on the butyl polymerization reaction. The TEAL completely prevented the HCl from depressing Mooney viscosity and reactor index, and also prevented the HCl from raising catalyst efficiency and warm-up rate. In fact, the simultaneous introduction of HCl and TEAL had very little effect on the reactor at all as contrasted to the disastrous effects HCl had in the absence of the protective buffering action of TEAL. The slight increase in Mooney viscosity and reactor index which occurred in this test series when HCl and TEAL were introduced simultaneously was due to the fact that a small amount of methanol was present in the feed and the TEAL was counteracting its effects as well as preventing the HCl from affecting the reactor.

Clearly, TEAL is an effective buffering agent against the harmful effects of HCl gas on butyl polymerization. Very small variations in the HCl level of butyl feeds do occur in normal practice and drastically affect reactor performance in the absence of TEAL but would have little effect on a buffered reactor containing TEAL.

EXAMPLE 17

Anhydrous chlorine gas is another powerful catalyst activator like HCl gas. At very low levels in the reactor feed, it severely depresses Mooney viscosity and reactor index and strongly increases catalyst efficiency and reactor warm-up rate. Injection of 7.5 ppm of chlorine gas into the feed of an equilibrated reactor causes effects very similar to those reported in example 16 for injection of 7.5 ppm of HCl gas. The reactor warms at a rapid rate, cannot be stabilized and plugs before a steady-state can be achieved. Since a test with injection of chlorine alone could not be run, a test with simultaneous injection of chlorine and TEAL was made to confirm that TEAL is an effective buffering agent against the harmful effects of chlorine on butyl polymerization. In this test the reactor was equilibrated normally and then injection of chlorine and TEAL into the feed was begun simultaneously to establish a new steady-state. The injection points were as in example 16. Feed rate into the reactor was 6542 Kg/hr. of a feed containing 33.5% in butylene and 0.87% isoprene by weight in methyl chloride. The feed analyses showed it was contaminated with about 8.2 ppm methanol. Chlorine was injected at 0.049 Kg/hr.=0.7 moles/hr.=7.6 ppm on feed, and TEAL was injected at 0.74 Kg/hr.=6.5 moles/hrs.=113 ppm on feed. The molar ration of TEAL/$Cl_2$ was 9.28. Data from the steady-state portions of this run are summarized below:

| SUMMARY RESULTS-CHLORINE/TEAL SIMULTANEOUS INJECTION | | |
|---|---|---|
| | BEFORE TEST | CHLORINE AND TEAL SIMULTANEOUSLY |
| Mooney Viscosity | 51 | 53 |
| Reactor Index | 9.1 | 9.5 |
| Unreacted Isobutylene, % | 5.6 | 5.6 |
| Isobutylene Conversion, % | 87.1 | 87.4 |
| $AlCl_3$ Rate, | | |
| Kg/hr. | 1.39 | 0.91 |
| Moles/hr | 10.46 | 6.8 |
| $AlCl_3$ Efficiency, W/W | 1367 | 2106 |
| Warm-up Rate, °C./hr. | 0.1 | 0.2 |

These data show that TEAL is an effective buffering agent to prevent the disastrous effects of chlorine upon butyl polymerization. Simultaneous introduction of chlorine and TEAL caused a mild improvement in Mooney viscosity, reactor index and catalyst efficiency and had little effect on warm-up rate. Some of the mild improvement was due to TEAL cancelling out the negative effects of the small amounts of methanol also present in the feed.

In the absence of TEAL, injection of a similar amount of chlorine would have caused the reactor to warm-up rapidly and plug, and would have severely depressed Mooney viscosity and reactor index as well as greatly increasing catalyst efficiency.

EXAMPLE 18

Tertiary butyl chloride is another very powerful activator in butyl polymerization. Its adverse effects are similar to those of HCl and chlorine but not quite as pronounced so that it is possible to run a sequential test and obtain several steady-states in the same reactor run. A series of large scale tests similar to those described in examples 12-18 was run to confirm the effectiveness of DIBAL H as a buffering agent against the adverse effects of t-butyl chloride in a butyl polymerization reactor. In this series of tests, t-butyl chloride was injected into an equilibrated reactor to establish a new steady-state. Then DIBAL H was injected into the cold feed downstream of the t-butyl chloride and immediately before entering the reactor to establish a third steady-state with DIBAL H counteracting the adverse effects of t-butyl chloride. Catalyst rate adjustments were made after each change to keep conversion as constant as possible. Feed rate into the reactor for this series of tests was 6542 Kg/hr. of a feed containing 33% isobutylene and 0.86% isoprene by weight in methyl chloride. Tertiary butyl chloride was injected at a rate of 0.046 Kg/hr.=0.5 moles/hr.=7 ppm on feed. DIBAL H was injected at 0.32 Kg/hr.=2.24 moles/hr.=48 ppm on feed. The molar ratio of DIBAL H/t-butyl chloride was 4.48. Data from the various steady-state portions of the run are summarized below:

| SUMMARY RESULTS-t-BUTYL CHLORIDE FOLLOWED BY DIBAL H SERIES | | | |
|---|---|---|---|
| | BEFORE TEST | +t-BuCl | +T-BuCl & DIBAL H |
| Mooney | 59 | 49 | 62 |
| Reactor Index | 10.5 | 8.7 | 10.3 |
| Unreacted Isobutylene, % | 5.6 | 5.6 | 6.0 |
| Isobutylene Conversion, % | 87.0 | 87.6 | 85.8 |
| $AlCl_3$ Rate, | | | |
| Kg/hr. | 1.23 | 0.375 | 1.43 |
| Moles/hr. | 9.22 | 2.8 | 10.7 |
| $AlCl_3$ Efficiency, W/W | 1520 | 5045 | 1295 |

These data show that introduction of tertiary butyl chloride into the equilibrated reactor severely depresses Mooney and index and causes more than a three-fold increase in catalyst efficiency. Introduction of the DIBAL H completely cancels out all the adverse effects of the t-butyl chloride. Mooney viscosity and reactor index are restored to the before-test levels and the catalyst activation effect is more than completely cancelled.

These data show that DIBAL H is a very effective buffering agent against the harmful effects of t-butyl chloride in a butyl reactor. An increase in the t-butyl chloride level of the butyl feed would cause production of off-specification product and very seriously affect performance of an unbuffered reactor, whereas the same increase in feed t-butyl chloride level would have almost no effect in a reactor protected by effective buffering agents such as DIBAL H or TEAL. This ability of these agents to buffer the reactor against the serious consequences of incursions of powerful activators into the feed is of great economic benefit.

EXAMPLE 19

As still further confirmation of the effectiveness of TEAL as a buffering agent to protect operating butyl reactors against the adverse consequences of variations in the levels of trace quantities of poisons and activators in the feed streams, a third type of large scale test was made in addition to those already described. In normal operation of large scale butyl reactors, the feed components (methyl chloride, isobutylene, isoprene and isobutylene dimer) are continuously metered at the desired rates and ratios into a feed blend tank where they are mixed and blended to prepare the feed blend, which is metered to separate reactors which may be in operation. A convenient way of demonstrating the effectiveness of a buffering agent against a poison or activator is to have two reactors in production being fed from the same feed blend tank with only one of the reactors being protected by injection of the buffering agent into its feed stream. Then a quantity of poison or activator is injected into the feed blend tank so the poisoned feed is fed to both reactors. The difference in the response of the protected reactor containing the buffering agent and the normal reactor can then be used to evaluate the effectiveness of the buffering agent against that poison. This type of test was run with propionic acid as the activator and TEAL as the buffering agent.

This is not a steady-state test as in the previous examples, but a test which measures the transient response of the reactors to a fluctuation in the feed poison level. In this test with propionic acid, a quantity of propionic acid was introduced into the feed blend to yield 24.2 ppm by weight of propionic acid in the feed at the start of the test. This level then decreased exponentially in the feed blend tank as more clean feed was continuously added. Computer calculations were made of the decay rate and showed that the propionic acid level had fallen to 1 ppm about 107 minutes after the start of the test. The propionic acid level in the reactors started at 0, rose for a time as the poisoned feed was fed to them and then slowly decayed again as the propionic acid was flushed from the system. Computer calculations showed the maximum propionic acid level in the reactors reached 7.4 ppm about 39 minutes after the start of the test and had fallen to 1 ppm after 170 minutes. Reactor conditions were continually changing during this time, but no changes in catalyst rate were made. The reactors were allowed to respond naturally to the changing propionic acid level. Propionic acid is a fairly potent activator for butyl polymerization, but much weaker than HCl, t-butyl chloride, or anhydrous chlorine gas discussed in earlier examples.

Feed rate to both reactors during this test was 7870 Kg/hr. of a feed containing 33.1% isobutylene and 0.87% isoprene by weight in methyl chloride. TEAL was being injected into the protected reactor at 0.724 Kg/hr.=6.35 moles/hr.=92 ppm on feed. Introduction of the spike of propionic acid into the feed blend had no noticeable effects on the reactor into which the TEAL was being injected as a buffering agent. This protected reactor continued to produce on-specification rubber with no sudden warming or change in unreacted isobutylene level. On the other hand, the control reactor containing no buffering agent suffered a severe upset due to the propionic acid contaminated feed. Reactor temperature increased by 2.5° C., unreacted isobutylene level fell by an increment of 2.5%, and Mooney viscosity of the butyl rubber being produced fell by 15 points. This reactor produced off-specification rubber for more than 4 hours before it finally recovered from the upset. There was thus a very dramatic difference in the response of the protected reactor and that of the control reactor to the addition of propionic acid to the feed. The TEAL acted effectively as a buffering agent to prevent the reactor into which it was being injected from being affected in any way by the incursion of the activator into the feed, wherein the control reactor was badly upset and produced a large amount of unacceptable rubber. The economic benefit of using the buffering agent is dramatically shown by this test.

Clearly TEAL is a very effective buffering agent against the adverse effects of propionic acid on butyl polymerization. Although this was an artificial test in that propionic acid was purposely injected into the feed, it closely simulates an actual upset situation caused by poisons or activators in the feed. These materials normally enter the feed when there is some upset in the recycle system (i.e., fractionating towers or dryers) or when a batch of contaminated raw materials (i.e., monomers or diluent) enter. The poison or activator is thus introduced naturally in much the same way as simulated in this test. The very excellent stabilizing effect of the TEAL is readily apparent and would be very valuable.

EXAMPLE 20

Another test similar to that described in example 19 was run to compare the transient response of a buffered reactor and control reactor to an incursion of isopropyl alcohol into the feed. Isopropyl alcohol is a fairly strong activator in butyl feed. In this test a large slug of alcohol was introduced into the feed blend tank to determine the response of the reactors to a large incursion of activator. Enough isopropyl alcohol was injected at once into the feed blend tank to raise the alcohol level to 120 ppm and this was allowed to decrease exponentially as new feed was continually added and the contaminated feed was fed to the reactors. Computer calculations showed the alcohol level in the feed blend tank decayed to 1 ppm after 124 minutes. The isopropanol level in the reactors rose slowly from 0 to 31.7 ppm in 33 minutes and then fell back down slowly to 1 ppm after 218 minutes. As in the test of example 19, it was planned to allow the TEAL protected and the control reactor to respond normally to the incursion of the alcohol-contaminated feed, but the alcohol contaminated feed had such a drastic effect on the control reactor that it became necessary to stop catalyst flow to that reactor and take it out of production; the TEAL-protected reactor was not significantly affected.

In this test, TEAL was injected into the feed of the buffered reactor at 0.724 Kg/hr.=6.35 moles/hr.=92 ppm on feed. The feed rate to both producing reactors was 7870 Kg/hr. of a feed containing 33.1% isobutylene and 0.87% isoprene by weight in methyl chloride.

There was no significant change at all in the buffered reactor which was protected by having TEAL injected into its feed. Temperature rose by a few tenths of a degree, but this is hardly more than the normal fluctuations a reactor experiences; and there was no change in unreacted isobutylene level or Mooney viscosity of the rubber being produced. The TEAL was obviously acting as an effective buffer.

On the other hand, the control, unprotected reactor was so severely upset by the isopronanol-contaminated feed that it has to be taken out of production and cleaned. Reactor temperature started rising rapidly about 8-10 minutes after the isopropanol was introduced into the feed blend, and the temperature continued to rise rapidly. After 20 minutes, catalyst flow was stopped to this reactor in an effort to keep it from overheating, but temperature continued to rise. By 25 minutes the reactor temperature was nearly 5° C. warmer than at the start and was continuing to rise. The slurry was so warm at that point that the reactor was beginning to plug and it had to be taken out of production and put through a wash cycle for cleaning. Unreacted isobutylene concentration in the reactor had fallen by more than an increment of 3% and the Mooney viscosity or the polymer being produced had also started to plummet. Clearly the isopropanol-contaminated feed had drastically affected this normal reactor causing the test run to be terminated prematurely.

These data again show the effectiveness of TEAL as a buffering agent to protect an operating butyl reactor against upsets caused by variations in the levels of poisons and activators in the reactor feed streams. A TEAL buffered reactor is able to continue producing acceptable butyl rubber during periods of feed quality fluctuation which would cause a normal unprotected reactor to produce unacceptable rubber or to become so upset that rapid fouling and agglomeration of slurry particles force a termination of the cycle for cleaning. The significant economic advantages which accrue from this ability to maintain reactors in stable operation despite variations in feed quality are obvious.

What is claimed is:

1. In the soluble Lewis Acid catalyzed polymerization method of preparing $C_4$–$C_7$ isoolefin homopolymers or copolymers of a $C_4$–$C_7$ isoolefin and a $C_4$–$C_{14}$ conjugated diene in an inert diluent, the improvement which comprises adding to the polymerization reaction zone a buffering or complexing agent in an amount at least effective to protect the said homopolymers or copolymers against molecular weight depression due to the presence of polymerization activators or poisons, the buffering or complexing agent being (1) a lower trialkyl aluminum, the alkyl being methyl or ethyl or (2) a lower dialkyl aluminum hydride, the alkyl of said hydride being a $C_1$–$C_4$ alkyl group wherein said buffering or complexing agent is added to said polymerization reaction zone by adding said agent to the cold, incoming monomer feedstream at a point immediately prior to the introduction of said feedstream into said polymerization reaction zone.

2. In the soluble Lewis Acid catalyzed polymerization method of preparing $C_4$–$C_7$ isoolefin homopolymers or copolymers of a $C_4$–$C_7$ isoolefin and a $C_4$–$C_{14}$ conjugated diene in an inert diluent, the improvement which comprises adding to the polymerization reaction zone about 0.1 to about 1.25 mole of a buffering or complexing agent per mole of Lewis Acid catalyst in an amount at least effective to protect the said homopolymers or copolymers against molecular weight depression due to the presence of polymerization activators or poisons, the buffering or complexing agent being (1) a lower trialkyl aluminum, the alkyl being methyl or ethyl or (2) a lower dialkyl aluminum hydride, the alkyl of said hydride being a $C_1$–$C_4$ alkyl group wherein said buffering or complexing agent is added to said polymerization reaction zone by adding said agent to the cold, incoming monomer feedstream at a point immediately prior to the introduction of said feedstream into said polymerization reaction zone.

3. In the soluble Lewis Acid catalyzed polymerization method of preparing $C_4$–$C_7$ isoolefin homopolymers or copolymers of a $C_4$–$C_7$ isoolefin and $C_4$–$C_{14}$ conjugated diene in an inert diluent, the improvement which comprises adding to the polymerization reaction zone about 0.1 to 1 mole of a buffering or complexing agent per mole of Lewis Acid catalyst in an amount at least effective to protect the said homopolymers or copolymers against molecular weight depression due to the presence of polymerization activators or poisons, the buffering or complexing agent being (1) a lower trialkyl aluminum, the alkyl being methyl or ethyl or (2) a lower dialkyl aluminum hydride, the alkyl of said hydride being a $C_1$–$C_4$ alkyl group wherein said buffering or complexing agent is added to said polymerization reaction zone by adding said agent to the cold, incoming monomer feedstream at a point immediately prior to the introduction of said feedstream into said polymerization reaction zone.

4. The method of claim 1 wherein the buffering or complexing agent is triethyl aluminum.

5. The method of claim 1 wherein the buffering or complexing agent is trimethyl aluminum.

6. The method of claim 1 wherein the buffering or complexing agent is diisobutyl aluminum hydride.

7. The method of claim 1 wherein the amount of buffering or complexing agent is up to about 1.0 mole of said agent per mole of said catalyst.

8. The method of claim 1 wherein the amount of buffering or complexing agent is at least in molar excess of the amount of polymerization poisons present in the polymerization reaction mixture.

9. The method of claim 1 wherein said homopolymer is polyisobutylene and said copolymer is isobutylene-isoprene butyl rubber.

10. The method of claim 1 wherein the catalyst is aluminum chloride.

11. The method of claim 1 wherein the inert diluent is selected from the group consisting of methyl chloride, methylene chloride, vinyl chloride, ethyl chloride, propane, butane, pentanes or hexanes.

12. The method of claim 1 wherein said buffering or complexing agent is added to said polymerization zone prior to the time of introduction of monomers and catalyst.

13. The method of claim 1 wherein said buffering or complexing agent is in contact with said isoolefin monomer or isoolefin and conjugated diene prior to polymerization for a period of time of less than about 60 seconds.

14. The method of claim 1 wherein said isoolefin homopolymer is polyisobutylene.

15. The method of claim 1 wherein said copolymer is isobutylene-isoprene butyl rubber.

16. The method of claim 9 wherein said butyl rubber has a viscosity average molecular weight of 250,000 to 600,000, the diluent is methyl chloride, the catalyst is aluminum chloride and the buffering or complexing agent is selected from the group consisting of triethyl aluminum, trimethyl aluminum, or diisobutyl aluminum hydride.

17. The method of claim 11 wherein the inert diluent is methyl chloride.

* * * * *